United States Patent
Porras et al.

(10) Patent No.: US 9,914,462 B2
(45) Date of Patent: Mar. 13, 2018

(54) PRECONDITIONING ELECTRIFIED VEHICLE SUBSYSTEMS BASED ON WEATHER FORECASTS

(71) Applicant: FORD GLOBAL TECHNOLOGIES, LLC, Dearborn, MI (US)

(72) Inventors: Angel Fernando Porras, Dearborn, MI (US); Timothy Noah Blatchley, Dearborn, MI (US); Christopher Adam Ochocinski, Canton, MI (US); Ryan J. Skaff, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 8 days.

(21) Appl. No.: 15/007,595

(22) Filed: Jan. 27, 2016

(65) Prior Publication Data

US 2017/0210390 A1    Jul. 27, 2017

(51) Int. Cl.
| | | |
|---|---|---|
| *B60W 50/00* | (2006.01) | |
| *B60K 6/40* | (2007.10) | |
| *B60K 6/445* | (2007.10) | |
| *B60W 30/18* | (2012.01) | |
| *B60W 30/192* | (2012.01) | |

(52) U.S. Cl.
CPC ........... *B60W 50/0098* (2013.01); *B60K 6/40* (2013.01); *B60K 6/445* (2013.01); *B60W 30/18054* (2013.01); *B60W 50/0097* (2013.01); *B60W 30/192* (2013.01); *B60W 2050/0077* (2013.01); *B60W 2050/0089* (2013.01); *B60W 2550/12* (2013.01); *B60W 2710/0688* (2013.01); *B60W 2710/1072* (2013.01); *B60W 2710/246* (2013.01); *B60W 2710/30* (2013.01); *B60Y 2200/92* (2013.01); *B60Y 2300/24* (2013.01); *Y10S 903/951* (2013.01)

(58) Field of Classification Search
None
See application file for complete search history.

(56) References Cited

U.S. PATENT DOCUMENTS

| | | | |
|---|---|---|---|
| 8,212,527 B2 | 7/2012 | Zhang et al. | |
| 8,294,420 B2 | 10/2012 | Kocher | |
| 8,341,971 B2 * | 1/2013 | Oyobe | B60H 1/004 236/1 C |
| 8,914,173 B2 | 12/2014 | Biondo et al. | |
| 9,002,568 B2 * | 4/2015 | Datta | B60R 16/02 236/46 R |
| 9,121,490 B2 * | 9/2015 | Papajewski | H05B 6/802 |
| 2007/0272290 A1 * | 11/2007 | Sims | B60H 1/004 136/201 |
| 2011/0153140 A1 * | 6/2011 | Datta | B60R 16/02 701/31.4 |
| 2014/0012445 A1 | 1/2014 | Fleckenstein et al. | |
| 2014/0129063 A1 * | 5/2014 | Clark | B60W 10/08 701/22 |

(Continued)

*Primary Examiner* — Rami Khatib
(74) *Attorney, Agent, or Firm* — Carlson, Gaskey & Olds

(57) ABSTRACT

A method for preconditioning various subsystems of an electrified vehicle according to an exemplary aspect of the present disclosure includes, among other things, scheduling preconditioning of a battery pack, an interior cabin, a transmission and an engine of the electrified vehicle prior to a next expected usage time based at least on a weather forecast.

23 Claims, 4 Drawing Sheets

(56) References Cited

U.S. PATENT DOCUMENTS

| | | | |
|---|---|---|---|
| 2014/0277869 A1* | 9/2014 | King | B60H 1/00278 701/22 |
| 2015/0041113 A1 | 2/2015 | Enke et al. | |
| 2015/0114089 A1* | 4/2015 | Dudar | F02M 25/0809 73/40 |
| 2015/0158378 A1* | 6/2015 | Dudar | B60K 15/03 701/22 |
| 2015/0375657 A1* | 12/2015 | Braun | B60N 3/048 219/202 |

* cited by examiner

PRECONDITIONING ELECTRIFIED VEHICLE SUBSYSTEMS BASED ON WEATHER FORECASTS

TECHNICAL FIELD

This disclosure relates to a vehicle system and method for an electrified vehicle. Various subsystems of the electrified vehicle may be preconditioned prior to a next expected usage time of the electrified vehicle based on weather forecasts and other information.

BACKGROUND

The need to reduce automotive fuel consumption and emissions is well known. Therefore, vehicles are being developed that reduce reliance on internal combustion engines. Electrified vehicles are one type of vehicle being developed for this purpose. In general, electrified vehicles differ from conventional motor vehicles because they are selectively driven by one or more battery powered electric machines and may have additional power sources such as an internal combustion engine. Conventional motor vehicles, by contrast, rely exclusively on the internal combustion engine to drive the vehicle.

Electrified vehicles present unique thermal management challenges. For example, achieving desired comfort levels within the interior cabin of the electrified vehicle must be balanced against maximizing the fuel economy and/or electric range of the electrified vehicle.

SUMMARY

A method for preconditioning various subsystems of an electrified vehicle according to an exemplary aspect of the present disclosure includes, among other things, scheduling preconditioning of a battery pack, an interior cabin, a transmission and an engine of the electrified vehicle prior to a next expected usage time based at least on a weather forecast.

In a further non-limiting embodiment of the foregoing method, scheduling the preconditioning includes determining the next expected usage time associated with the electrified vehicle.

In a further non-limiting embodiment of either of the foregoing methods, determining the next expected usage time includes inferring the next expected usage time based on historical usage information associated with the electrified vehicle.

In a further non-limiting embodiment of any of the foregoing methods, determining the next expected usage time includes receiving instructions from a user about a planned usage of the electrified vehicle.

In a further non-limiting embodiment of any of the foregoing methods, the method includes determining whether the electrified vehicle is on plug prior to scheduling the preconditioning.

In a further non-limiting embodiment of any of the foregoing methods, the method includes gathering temperature information from the various subsystems prior to scheduling the preconditioning.

In a further non-limiting embodiment of any of the foregoing methods, the method includes obtaining the weather forecast from a web-based server.

In a further non-limiting embodiment of any of the foregoing methods, the method includes communicating with the web-based server over a cloud to obtain the weather forecast.

In a further non-limiting embodiment of any of the foregoing methods, the method includes actuating at least one touch point of the electrified vehicle based at least on the next expected usage time and the weather forecast.

In a further non-limiting embodiment of any of the foregoing methods, the at least one touch point includes a steering wheel, a seat, a window, a mirror or a gear shift.

In a further non-limiting embodiment of any of the foregoing methods, the method includes actuating a conditioning device of each of the battery pack, the engine, the transmission and the interior cabin at a scheduled time after scheduling the preconditioning.

In a further non-limiting embodiment of any of the foregoing methods, the method includes prioritizing preconditioning of one of the engine, the battery pack, the interior cabin and the transmission over the other of the engine, the battery pack, the interior cabin and the transmission.

In a further non-limiting embodiment of any of the foregoing methods, the method includes adjusting a temperature of an engine coolant such that the temperature is within a desired operating range at a scheduled time after scheduling the preconditioning.

In a further non-limiting embodiment of any of the foregoing methods, the method includes adjusting a temperature of a transmission fluid such that the temperature is within a desired operating range at a scheduled time after scheduling the preconditioning.

In a further non-limiting embodiment of any of the foregoing methods, the method includes adjusting a temperature of the battery pack such that the temperature is within a desired operating range at a scheduled time after scheduling the preconditioning.

An electrified vehicle according to another exemplary aspect of the present disclosure includes, among other things, a plurality of vehicle subsystems, a plurality of touch points and a control system configured with instructions for preconditioning the plurality of vehicle subsystems and actuating the plurality of touch points prior to a next expected usage time based at least on a weather forecast.

In a further non-limiting embodiment of the foregoing electrified vehicle, the plurality of vehicle subsystems include at least an engine, a battery pack, a transmission and an interior cabin.

In a further non-limiting embodiment of either of the foregoing electrified vehicles, the plurality of touch points include at least a steering wheel, a vehicle seat, a gear shifter, a window defroster, and a side mirror.

In a further non-limiting embodiment of any of the foregoing electrified vehicles, each of the plurality of vehicle subsystems includes a sensor configured to monitor temperatures, the control system configured to monitor the temperatures for scheduling the preconditioning.

In a further non-limiting embodiment of any of the foregoing electrified vehicles, the control system includes a transceiver configured to communicate with a server over a cloud to obtain the weather forecast.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes a vehicle system and method for preconditioning electrified vehicle subsystems. An exemplary control strategy includes scheduling preconditioning of a battery pack, an interior cabin, a transmission, an engine and/or other subsystems of the electrified vehicle prior to a next expected usage time based at least on a weather forecast. These and other features are discussed in greater detail in the following paragraphs of this detailed description.

Figure 1:
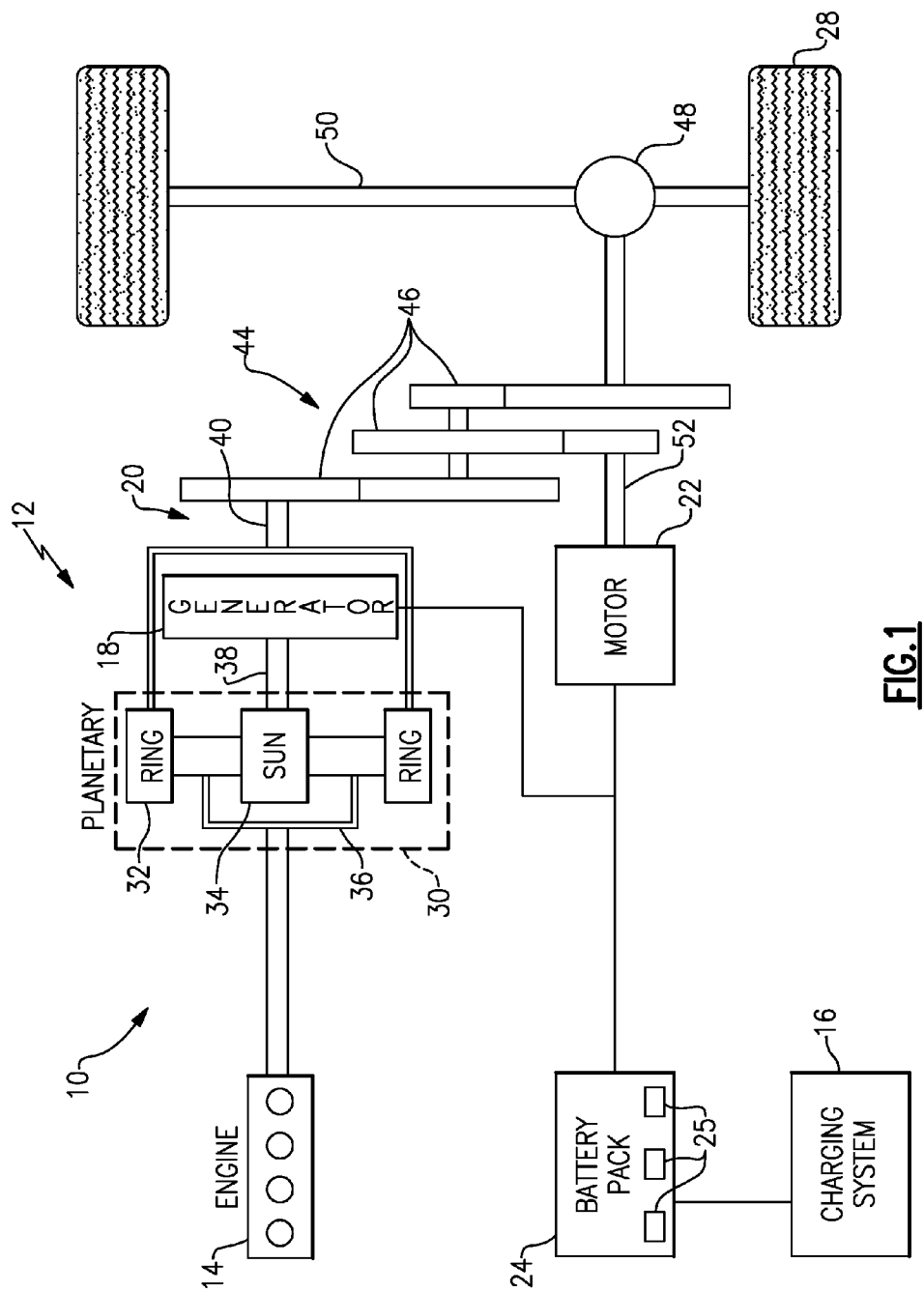
FIG. 1 schematically illustrates a powertrain of an electrified vehicle.

FIG. 1 schematically illustrates a powertrain 10 for an electrified vehicle 12. In one non-limiting embodiment, the electrified vehicle 12 is a plug-in hybrid electric vehicle (PHEV). However, other electrified vehicles could also benefit from the teachings of this disclosure, including but not limited to, battery electric vehicles (BEV's) and hybrid electric vehicles (HEV's).

In one non-limiting embodiment, the powertrain 10 is a power-split powertrain system that employs a first drive system and a second drive system. The first drive system may include a combination of an engine 14 and a generator 18 (i.e., a first electric machine). The second drive system includes at least a motor 22 (i.e., a second electric machine) and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28. In one embodiment, the power transfer units 30, 44 are part of a transaxle 20 of the electrified vehicle 12.

The motor 22 can also be employed to drive the vehicle drive wheels 28 by outputting torque to a shaft 52 that is also connected to the second power transfer unit 44. In one embodiment, the motor 22 is part of a regenerative braking system. For example, the motor 22 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

The electrified vehicle 12 may also include a charging system 16 for charging the energy storage devices (e.g., battery cells) of the battery pack 24. The charging system 16 may be connected to an external power source (e.g., electrical grid, not shown) for receiving and distributing power throughout the vehicle. The charging system 16 may also be equipped with power electronics used to convert AC power received from the external power supply to DC power for charging the energy storage devices of the battery pack 24. The charging system 16 may also accommodate one or more conventional voltage sources from the external power supply (e.g., 110 volt, 220 volt, etc.).

The powertrain 10 shown in FIG. 1 is highly schematic and is not intended to limit this disclosure. Various additional components could alternatively or additionally be employed by the powertrain 10 within the scope of this disclosure.

Figure 2:
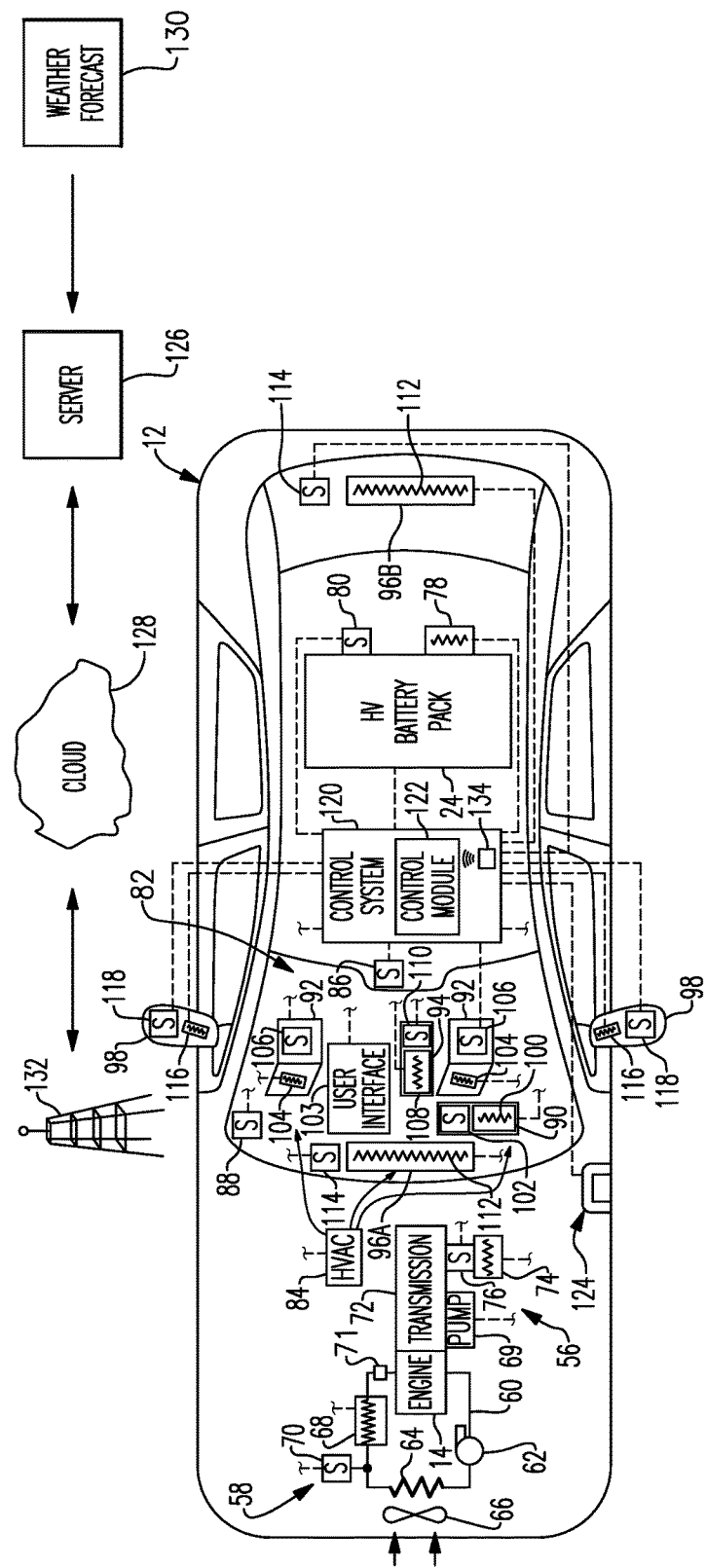
FIG. 2 illustrates a vehicle system of an electrified vehicle.

FIG. 2 is a highly schematic depiction of a vehicle system 56 that may be employed within an electrified vehicle, such as the electrified vehicle 12 of FIG. 1. The various components of the vehicle system 56 are shown schematically to better illustrate the features of this disclosure. These components, however, are not necessarily depicted in the exact locations where they would be found in an actual vehicle and are not necessarily shown to scale.

The vehicle system 56 is adapted to schedule and command preconditioning of various subsystems of the electrified vehicle 12 prior to a next expected usage time. Predictive controls, such as weather forecasts, can be used to schedule the preconditioning of various subsystems and to determine how much thermal conditioning is necessary for each subsystem in a manner that influences power consumption, fuel economy and electric range of the electrified vehicle 12.

The exemplary vehicle system 56 includes a plurality of vehicle subsystems. In one non-limiting embodiment, each vehicle subsystem includes its own subsystem conditioning system/device for conditioning (e.g., heating or cooling) portions of the vehicle subsystem prior to the next expected usage time. In another non-limiting embodiment, some subsystem conditioning systems/devices condition more than one vehicle subsystem.

A first vehicle subsystem of the vehicle system 56 includes the engine 14. The engine 14 may be an internal combustion engine or any other type of engine. An engine conditioning system 58 is configured to thermally manage the heat generated by the engine 14. The engine conditioning system 58 may circulate coolant through a coolant loop 60 using a pump 62. The coolant loop 60 may be in fluid communication with the engine 14 such that excess heat is transferred from the engine 14 to the coolant within the cooling loop 60. The excess heat may be rejected through a heat exchanger 64. A fan 66 may direct air across the heat exchanger 64 in order to transfer heat from the coolant within the coolant loop 60 to the ambient air.

The coolant loop 60 may additionally include a first conditioning device 68 having a heater and/or cooler that is configured to adjust the temperature of the coolant within the coolant loop 60 to either adjust the temperature or maintain the temperature within an optimal or desired operating temperature range of the coolant. The first conditioning device 68 could include a thermoelectric cooler, a thermoelectric heater, an immersion heater, a heater having resistance heating elements, a positive temperature coefficient (PTC) heater, or any other type of heater or cooler (or combination thereof) that is capable of adjusting or maintaining the temperature of the coolant within the coolant loop 60. In a first non-limiting embodiment, the first conditioning device 68 is used to adjust the temperature of the coolant within the coolant loop 60 without running the engine 14. In an alternative embodiment, the engine 14 is operated to adjust or maintain the temperature of the coolant within the coolant loop 60 such that the temperature is within the optimal or desired operating temperature range. In yet another non-limiting embodiment, a coolant valve 71 is positioned between the engine 14 and the first conditioning device 68 to control flow of the coolant to the engine 14.

A first sensor 70 (or series of sensors) is employed to monitor the temperature of the coolant within the coolant loop 60. The first conditioning device 68 may be activated based on the temperature readings of the first sensor 70 in order to adjust the temperature of the coolant within the coolant loop 60 to a desired operating temperature range. In an alternative embodiment, the engine 14 and the engine conditioning system 58 are activated to adjust the temperature of the coolant within the coolant loop 60.

A second vehicle subsystem includes a transmission 72, which can be an automatic or manual transmission. The transmission 72 circulates transmission fluid or lubricant that has an optimal operating temperature. Although not specifically shown by the highly schematic depiction of FIG. 2, the transmission 72 includes a series of gears, clutches, brakes, etc. and a transmission pump 69 is configured to circulate the transmission fluid to the various components of the transmission 72 and/or maintain a desired pressure of the transmission fluid. The transmission 72 may additionally include a torque converter, although not specifically shown.

The transmission 72 includes a second conditioning device 74 having a heater and/or cooler that is configured to adjust the temperature of the transmission fluid to a desired operating temperature. The second conditioning device 74 could include a thermoelectric cooler, a thermoelectric heater, an immersion heater, a heater having resistance heating elements, a positive temperature coefficient (PTC) heater, or any other type of heater or cooler (or combination thereof) that is capable of adjusting or maintaining the temperature of the transmission fluid. In an alternative embodiment, operation of the transmission 72 is controlled to either adjust or maintain the temperature of transmission fluid.

A second sensor 76 (or a multitude of sensors) is adapted to monitor the temperature of the transmission fluid contained within the transmission 72. Based on the temperature readings of the second sensor 76, the second conditioning device 74 may be activated to adjust the temperature of the transmission fluid to a desired operating temperature range. In an alternative embodiment, operation of the transmission 72 is controlled in a manner that adjusts the temperature of the transmission fluid.

A third vehicle subsystem includes the battery pack 24. The battery pack 24 may include one or more battery assemblies each having a plurality of battery cells or other energy storage devices. The energy storage devices of the battery pack 24 store electrical energy that is selectively supplied to power various electrical loads residing onboard the electrified vehicle 12. These electrical loads may include various high voltage loads (e.g., electric machines, etc.) or various low voltage loads (e.g., lighting systems, low voltage batteries, logic circuitry, etc.).

The battery pack 24 includes a third conditioning device 78 including a heater and/or cooler that is configured to adjust the temperature of the battery pack 24 to a desired operating temperature or range of temperatures. The third conditioning device 78 could include a thermoelectric cooler, a thermoelectric heater, a heater having resistance heating elements, a positive temperature coefficient (PTC) heater, or any other type of heater or cooler (or combination thereof) that is capable of adjusting or maintaining the temperature of the battery pack 24. In one non-limiting embodiment, the third conditioning device 78 includes a cooling loop that cycles a coolant or refrigerant through the battery pack 24 to either heat or cool the battery pack 24. The coolant can be heated using a heater or cooled via chiller or a refrigerant to coolant heat exchanger. In another non-limiting embodiment, the engine conditioning system 58 is utilized as part of the system for conditioning/heating the battery pack 24.

A third sensor 80 (or collection of sensors) monitors the temperature of the battery pack 24 or monitors the temperature of the energy storage devices of the battery pack 24. The third conditioning device 78 may be activated to adjust the temperature of the battery pack 24 based on the temperature values obtained by the third sensor 80. In another embodiment, the third sensor 80 is configured to measure battery coolant temperatures.

A fourth vehicle subsystem includes an interior cabin 82 of the electrified vehicle 12. An HVAC system 84 is configured to either heat or cool the interior cabin 82. The HVAC system 84 includes a heater and/or cooler that is configured to adjust the temperature of the air inside the interior cabin 82 to a desired temperature range or comfort setting. The HVAC system 84 may include a thermoelectric cooler, a thermoelectric heater, a heater having resistance heating elements, a positive temperature coefficient (PTC) heater, or any other type of heater or cooler (or combination thereof) that is capable of adjusting or maintaining the temperature of the interior cabin 82. In one non-limiting embodiment, a heating portion of the HVAC system 84 includes a fan that blows air across a heater core that is connected to the coolant loop 60 of the engine conditioning system 58 to deliver heated air into the interior cabin 82. In another non-limiting embodiment, a cooling portion of the HVAC system 84 includes an air conditioning system having a refrigerant loop with at least an evaporator that is configured to cool the air entering the interior cabin 82, a compressor that is configured to cycle a refrigerant through the refrigerant loop, and a condenser that is configured to reject heat from the refrigerant to the ambient surroundings. The HVAC system 84 may additionally include a chiller for cooling the battery pack 24.

A fourth sensor 86 (or collection of sensors) monitors the temperature of the interior cabin 82 and a fifth sensor 88 (or collection of sensors) is used to monitor ambient temperatures outside the electrified vehicle 12. The HVAC system 84 may be activated to maintain or adjust the temperature of the interior cabin 82 based on the temperature readings of the fourth sensor 86 and the fifth sensor 88, in one non-limiting embodiment.

The vehicle system 56 may additionally include various touch or contact points where a user comes into physical contact with the electrified vehicle 12 or which provide some aspect of comfort or convenience to the user. For the purposes of this disclosure, the touch points are considered additional subsystems of the electrified vehicle 12. Exemplary touch points include a steering wheel 90, one or more vehicle seats 92, a gear shifter 94, a front defroster 96A, a rear defroster 96B, and one or more side mirrors 98. Additional touch points may include arm rests and floor mats. These touch points are intended as non-limiting examples only, and this disclosure should be construed such that the descriptions of these touch points may be applied to other touch points of the vehicle. The surface temperatures of the various touch points can be adjusted to a desired comfort level or range.

The steering wheel 90 may include a fourth conditioning device 100 having a heater and/or cooler that is configured to adjust the temperature of an outer surface of the steering wheel 90 to a desired temperature. The fourth conditioning device 100 may be a thermoelectric cooler, a thermoelectric heater, a heater having resistance heating elements, a positive temperature coefficient (PTC) heater, or any other type of heater or cooler (or combination thereof) that is capable of adjusting or maintaining the temperature of the steering wheel 90. In another non-limiting embodiment, the fourth conditioning device 100 includes a cooling loop that cycles a coolant through the steering wheel 90 to either heat or cool the steering wheel 90.

A sixth sensor 102 (or collection of sensors) monitors the outer surface temperature of the steering wheel 90. The fourth conditioning device 100 can be actuated to adjust the temperature of the steering wheel 90 based on the temperature values obtained by the sixth sensor 102.

One or more of the vehicle seats 92 may include a fifth conditioning device 104. The fifth conditioning device 104 includes a heater and/or cooler configured to adjust the temperature of the vehicle seat 92 to a desired temperature. The fifth conditioning device 104 may be located anywhere within the vehicle seat 92, such as within either the seat bottom or the seatback. The fifth conditioning device 104 may include a thermoelectric cooler, a thermoelectric heater, a heater having resistance heating elements, a positive temperature coefficient (PTC) heater, or any other type of heater or cooler (or combination thereof) that is capable of adjusting or maintaining the temperature of the vehicle seat 92. In another non-limiting embodiment, the fifth conditioning device 104 includes a cooling loop that cycles a coolant through the vehicle seat 92 to either heat or cool the vehicle seat 92.

A seventh sensor 106 (or multitude of sensors) is used to monitor the outer surface temperature of the vehicle seat 92. The fifth conditioning device 104 is actuated to adjust the temperature of the vehicle seat 92 based on the temperature values measured by the seventh sensor 106.

In yet another embodiment, the gear shift 94 includes a sixth conditioning device 108 configured to adjust the temperature of the gear shift 94 and an eighth sensor 110 (or multitude of sensors) configured to monitor the temperature of the gear shift 94, the front and rear defrosters 96A, 96B include a seventh conditioning device 112 configured to adjust a temperature of front and rear windows of the electrified vehicle 12 and a ninth sensor 114 (or multitude of sensors) configured to monitor the temperature of the front and rear windows, and the side mirrors 98 include an eighth conditioning device 116 configured to adjust the temperature of the side mirrors 98 and a tenth sensor 118 (or multitude of sensors) configured to monitor the temperature of the side mirrors 98. The vehicle system 56 could include various other vehicle subsystems within the scope of this disclosure. For example, although not shown, power electronics could also be thermally managed/controlled to a desired set point.

The vehicle system 56 additionally includes a control system 120. The control system 120 may be part of an overall vehicle control system or could be a separate control system that communicates with the vehicle control system. The control system 120 may include one or more control modules 122 equipped with executable instructions for interfacing with and commanding operation of various components of the vehicle system 56. For example, in one non-limiting embodiment, each vehicle subsystem described above can include a control module, and these control modules can communicate with one another over a controller area network (CAN) to control the electrified vehicle 12. In another non-limiting embodiment, each control module 122 of the control system 120 includes a central processing unit in communication with various types of computer readable storage devices or memory devices for executing the various control strategies and modes of the vehicle system 56. One exemplary control strategy is further discussed below with reference to FIG. 3.

The control system 120 is adapted to perform multiple functions. In a first non-limiting embodiment, the control system 120 is configured with the necessary inputs, outputs, control logic and/or algorithms for receiving signals from the various vehicle subsystems and commanding specific actions based on these received signals. For example, the control system 120 may activate the various conditioning devices 68, 74, 78, 84, 100, 104, 108, 112 and 116 based on temperature information received from the multiple sensors 70, 76, 80, 86, 88, 102, 106, 110, 114 and 118 in order to condition the various vehicle subsystems as necessary or as otherwise desired.

In a second non-limiting embodiment, the control system 120 is configured to determine a next expected usage time of the electrified vehicle 12. The next expected usage time can be manually specified by the user by entering usage information into a user interface 103 (located either inside the interior cabin 82 or remotely via a computer, smart device, etc.). The usage information can include a time of day on a specific day of the week that the user has scheduled to use the electrified vehicle 12.

Alternatively, the next expected usage time can be an inferred or learned value which is based on historical usage data associated with the electrified vehicle 12. For example, the control system 120 may learn the times a day the electrified vehicle 12 is operated by control logic and/or algorithms included within the control module 122. The learned times of day may correspond to a time of day on a specific day of the week based on the frequency or historical use of the electrified vehicle 12 relative to that time of day. The learned times of day may further correspond to a time of day on a specific day of the week that the engine 14 is manually started with the vehicle key or pushbutton, a plug is removed from a charging outlet 124, a key fob is used to wirelessly start the engine 14, or any other action that is indicative of vehicle use. The learned times may be recorded within the memory of the control system 120 when signals are received by the control module 122 indicating that the engine 14 has been started, the plug is removed from the charging outlet 124, or any other action that is indicative of a vehicle use.

In yet another non-limiting embodiment, the control system 120 of the electrified vehicle 12 may communicate with a server 126 over a cloud 128 (i.e., the internet) to obtain a weather forecast 130. Upon an authorized request, the weather forecast 130 may be transmitted to the control system 120. Upon receiving the weather forecast 130, the control system 120 may schedule preconditioning of various subsystems prior to the next expected usage event. The weather forecast 130 may be communicated via a cellular tower 132 or some other known communication technique. The control system 120 includes a transceiver 134 for bidirectional communication with the cellular tower 132. For example, the transceiver 134 can receive the weather forecast 130 from the server 126 or can communicate data back to the server via the cellular tower 132. Although not necessarily shown or described in this highly schematic embodiment, numerous other components may enable bidirectional communication between the electrified vehicle 12 and the server 126.

The control system 120 may schedule preconditioning of the various vehicle subsystems based on the next expected usage time, the weather forecast information and other information. For example, the control system 120 may schedule when to thermally condition the engine 14 based at least on the next expected usage time, engine conditions (e.g., coolant and oil temperatures) and the weather forecast information. The control system 120 may also schedule when to thermally condition the transmission 72 based at least on the next expected usage time, transmission conditions (e.g., temperature) and the weather forecast information. The control system 120 may further schedule when to thermally condition the battery pack 24 based at least on the next expected usage time, battery conditions (e.g., state of charge (SOC) and temperature) and weather forecast information. The control system 120 may also schedule when to thermally condition the interior cabin 82 based at least on the next expected usage time, cabin conditions (e.g., temperature) and the weather forecast information. Finally, the control system 120 may schedule when to actuate the various touch points of the electrified vehicle 12 based on the next expected usage time, cabin conditions and weather forecast information.

In yet another non-limiting embodiment, the control system 120 is adapted to prioritize the thermal conditioning of one subsystem over other subsystems of the electrified vehicle 12. The priority/assignment is done based on the thermal mass of the different subsystems, each subsystem's threshold effect on the vehicle at different temperatures, and the overall effect of each subsystem to electric range and fuel economy. By way of one non-limiting example, the transmission 72 would affect fuel economy at lower temperatures than the battery pack 24 but the battery pack 24 has a greater effect on the fuel economy and electric range. Thus, the control system 120 would cool/heat the battery pack 24 first. The control system 120 is capable of calculating a worst case scenario of around two hours of preconditioning but it is capable of scheduling as short as thirty minutes of preconditioning. The battery pack 24 would be preconditioned first for approximately an hour. The engine 14, the transmission 72 and the interior cabin 82 would then follow for approximately one hour. Last, the front and rear defrosters 96A, 96B would be activated approximately five minutes prior to next usage time and would run simultaneously to the interior cabin 82 thermal management.

Figure 3:
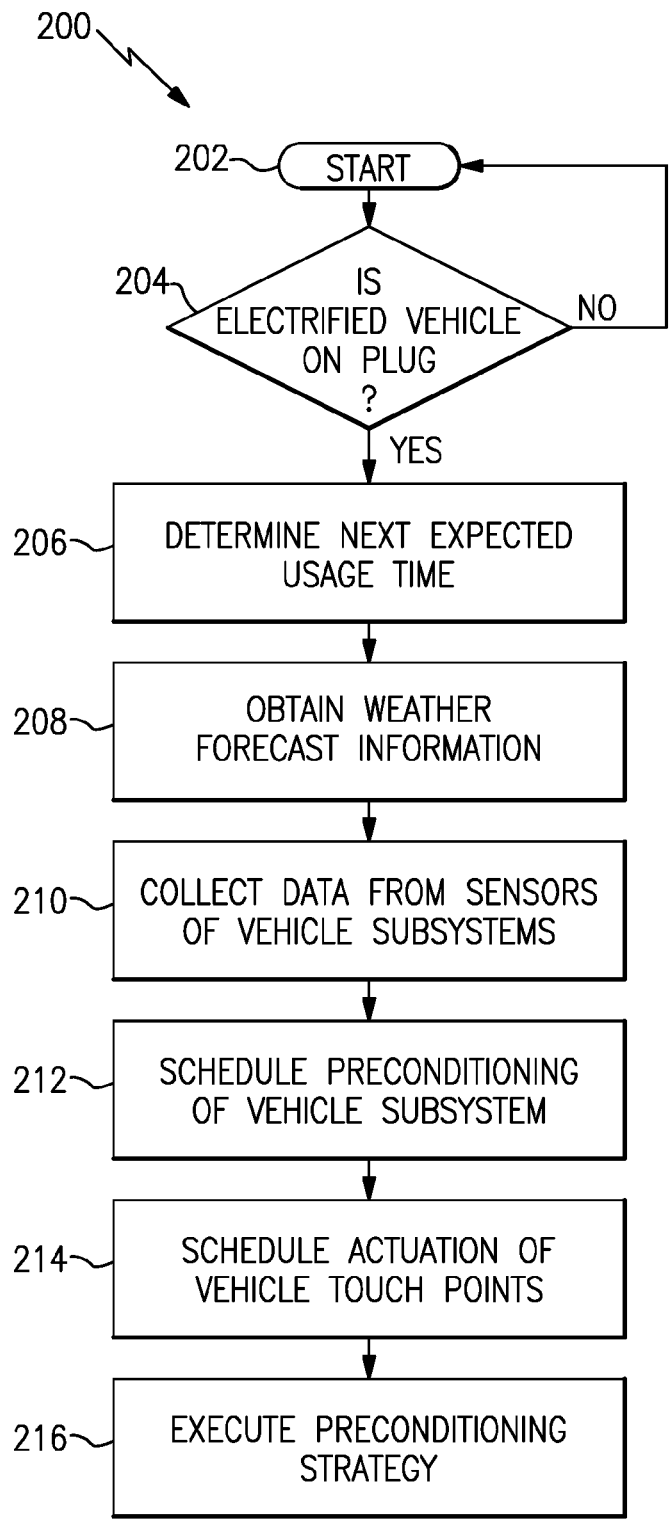
FIG. 3 schematically illustrates a control strategy for preconditioning various vehicle subsystems of an electrified vehicle based on weather forecasts.

FIG. 3, with continued reference to FIGS. 1 and 2, schematically illustrates a control strategy 200 for controlling the vehicle system 56 of the electrified vehicle 12. For example, the control strategy 200 can be performed to schedule and command preconditioning of various vehicle subsystems of the electrified vehicle 12. In one non-limiting embodiment, the control system 120 of the vehicle system 56 is programmed with one or more algorithms adapted to execute the exemplary control strategy 200, or any other control strategy. In another non-limiting embodiment, the control strategy 200 is stored as executable instructions in the non-transitory memory of the control module 122 of the control system 120.

The control strategy 200 begins at block 202. At block 204, the control strategy 200 determines whether the electrified vehicle 12 is on-plug and therefore receiving power from an external power source (i.e., an electrical grid). This is referred to as a plug event. A signal may be communicated from the charging outlet 124 to the control system 120 indicating the plug event, in one non-limiting embodiment.

The control strategy 200 proceeds to block 206 if the electrified vehicle 12 is on-plug. The next expected usage time of the electrified vehicle 12 can be inferred at this step. Next, at block 208, weather forecast information is obtained from the cloud 128. The weather forecast information may include a prediction of the state of the ambient surroundings for a given location on a given date and time. Data from the sensors (e.g., one or more of sensors 70, 76, 80, 86, 88, 102, 106, 110, 114 and 118) of the various vehicle subsystems is obtained and analyzed at block 210. Although shown sequentially, steps 206, 208 and 210 of the control strategy 200 may be performed in any order or simultaneously within the scope of this disclosure.

Utilizing at least the information gathered at blocks 206, 208 and 210, the control system 120 schedules preconditioning of various vehicle subsystems at block 212. The control system 120 determines the total amount of time to precondition each subsystem based on the power available and the delta temperature from forecasted temperature to a desire temperature. The control system 120 may then add the total number of minutes required to precondition the vehicle and schedule the start of preconditioning based on such number of minutes prior to next usage time. Of course, some systems could run simultaneously. The control system 120 keeps track of the amount of time each system undergoes preconditioning and could command the preconditioning ON or OFF at any time or as desired. In some non-limiting embodiments, the control system 120 schedules when to start the preconditioning, when to end the preconditioning, and the desired thermal characteristics (e.g., desired temperature range, etc.) of the preconditioning for each vehicle subsystem that requires preconditioning. Actuation of the various vehicle touch points can be scheduled at block 214 and may also be based, at least partially, on the weather forecast information. Finally, at block 216, the preconditioning is executed for each vehicle subsystem at the scheduled times before the next expected usage time.

Figure 4:
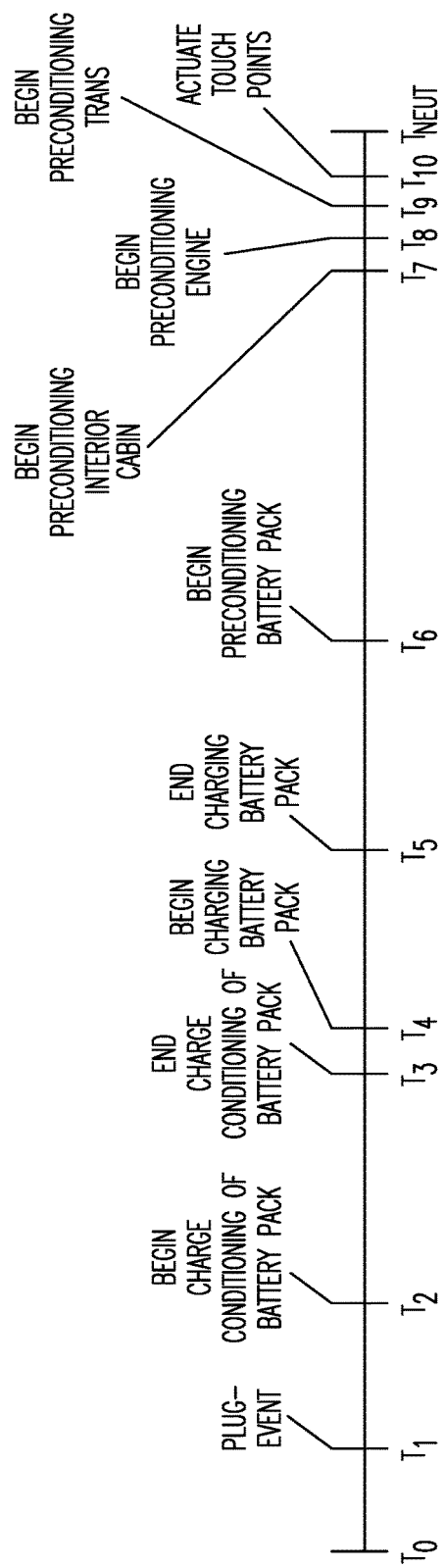
FIG. 4 schematically illustrates an exemplary implementation of the control strategy depicted in FIG. 3.

FIG. 4 is a timeline which illustrates an exemplary implementation of the control strategy 200 described with reference to FIG. 3. This example is provided for illustrative purposes only, and therefore, the specific values and parameters indicated in the timeline are not intended to limit this disclosure in any way.

A plug event occurs at a time $T_1$, thus indicating that the electrified vehicle 12 is connected to an external power source. In response to the plug event, the control system 120 of the electrified vehicle 12 schedules preconditioning of the various vehicle subsystems. The scheduled preconditioning may include determining the next expected usage time for the electrified vehicle 12. The next expected usage time is indicated at time $T_{next}$ in the timeline. The scheduled preconditioning may additionally include obtaining weather forecast information and gathering data from the various sensors associated with each of the various vehicle subsystems.

In one non-limiting embodiment, the control system 120 schedules charge conditioning of the battery pack 24 to begin at time $T_2$ and end at time $T_3$. Charging of the battery pack 24 is scheduled to begin at time $T_4$ and end at time $T_5$. Additional preconditioning of the battery pack 24 is scheduled to being at time $T_6$. Preconditioning of the interior cabin 82 is scheduled to begin at time $T_7$, preconditioning of the engine 14 is scheduled to begin at time $T_8$ and preconditioning of the transmission 72 is scheduled to begin at time $T_9$. The various vehicle touch points may be actuated at time $T_{10}$. Each of the times $T_2$ through $T_{10}$ occur prior to the next expected usage time $T_{next}$. The times $T_2$ through $T_{10}$ could occur earlier or later than shown if the weather forecast information is not taken into account and therefore the proposed preconditioning strategy of this disclosure is more accurate compared to prior strategies.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method for preconditioning various subsystems of an electrified vehicle, comprising:
automatically preconditioning a battery pack, an interior cabin, a transmission, and an engine of the electrified vehicle prior to a next expected usage time based at least on a weather forecast, wherein the preconditioning is controlled by a vehicle control system and includes preconditioning the battery pack first, then preconditioning the interior cabin, then preconditioning the engine, and then preconditioning the transmission.

2. The method as recited in claim 1, wherein the preconditioning includes determining the next expected usage time associated with the electrified vehicle.

3. The method as recited in claim 2, wherein determining the next expected usage time includes inferring the next expected usage time based on historical usage information associated with the electrified vehicle.

4. The method as recited in claim 3, wherein the historical usage information is updated each time the engine is started or a plug is removed from a charging outlet of the electrified vehicle.

5. The method as recited in claim 2, wherein determining the next expected usage time includes receiving instructions from a user about a planned usage of the electrified vehicle.

6. The method as recited in claim 1, comprising determining whether the electrified vehicle is on plug prior to the preconditioning.

7. The method as recited in claim 1, comprising gathering temperature information from the various subsystems prior to the preconditioning.

8. The method as recited in claim 1, comprising obtaining the weather forecast from a web-based server.

9. The method as recited in claim 8, comprising communicating with the web-based server over a cloud to obtain the weather forecast.

10. The method as recited in claim 1, comprising actuating at least one touch point of the electrified vehicle based at least on the next expected usage time and the weather forecast.

11. The method as recited in claim 10, wherein the at least one touch point includes a steering wheel, a vehicle seat, a window, a side mirror, or a gear shifter.

12. The method as recited in claim 1, comprising actuating a conditioning device of each of the battery pack, the engine, the transmission, and the interior cabin at a scheduled time to execute the preconditioning.

13. The method as recited in claim 1, comprising prioritizing preconditioning of one of the engine, the battery pack, the interior cabin, and the transmission over the other of the engine, the battery pack, the interior cabin, and the transmission.

14. The method as recited in claim 1, comprising adjusting a temperature of an engine coolant such that the temperature is within a desired operating range at a scheduled time to execute the preconditioning.

15. The method as recited in claim 1, comprising adjusting a temperature of a transmission fluid such that the temperature is within a desired operating range at a scheduled time to execute the preconditioning.

16. The method as recited in claim 1, comprising adjusting a temperature of the battery pack such that the temperature is within a desired operating range at a scheduled time to execute the preconditioning.

17. The method as recited in claim 1, comprising actuating at least one touch point of the electrified vehicle after preconditioning each of the battery pack, the interior cabin, the engine, and the transmission.

18. The method as recited in claim 1, wherein the weather forecast includes a prediction of a state of ambient surroundings at a location of the electrified vehicle and at an estimated date and time that is consistent with the next expected usage time.

19. An electrified vehicle, comprising:
a plurality of vehicle subsystems including an engine, a battery pack, a transmission, and an interior cabin;
a plurality of touch points; and
a control system configured with instructions for preconditioning said battery pack first, then preconditioning said interior cabin, then preconditioning said engine, then preconditioning said transmission, and then actuating said plurality of touch points prior to a next expected usage time based at least on a weather forecast.

20. The electrified vehicle as recited in claim 19, wherein said plurality of touch points include at least a steering wheel, a vehicle seat, a gear shifter, and a side mirror.

21. The electrified vehicle as recited in claim 19, wherein each of said plurality of vehicle subsystems includes a sensor configured to monitor temperatures, said control system configured to monitor said temperatures for scheduling said preconditioning.

22. The electrified vehicle as recited in claim 19, wherein said control system includes a transceiver configured to communicate with a server over a cloud to obtain said weather forecast.

23. The electrified vehicle as recited in claim 19, wherein said plurality of touch points include an arm rest or a floor mat.

* * * * *